(12) United States Patent
Williams et al.

(10) Patent No.: US 7,112,297 B2
(45) Date of Patent: Sep. 26, 2006

(54) OVERMOLDING INSERT FOR HEAT EXCHANGER, PROCESS FOR MANUFACTURING A HEAT EXCHANGER, AND HEAT EXCHANGER PRODUCED THEREBY

(75) Inventors: Charles G Williams, Toms River, NJ (US); John F. Messerschmidt, Lakewood, NJ (US); J. David Sizelove, Brick, NJ (US)

(73) Assignee: Aquatherm Industries Inc., Lakewood, NJ (US)

( * ) Notice: Subject to any disclaimer, the term of this patent is extended or adjusted under 35 U.S.C. 154(b) by 65 days.

(21) Appl. No.: 10/697,302

(22) Filed: Oct. 31, 2003

(65) Prior Publication Data

US 2004/0081777 A1    Apr. 29, 2004

Related U.S. Application Data

(62) Division of application No. 10/135,368, filed on May 1, 2002, now Pat. No. 6,787,116.

(60) Provisional application No. 60/287,726, filed on May 2, 2001.

(51) Int. Cl.
*B29C 45/14* (2006.01)
*B29C 70/84* (2006.01)

(52) U.S. Cl. .................. 264/277; 264/278; 264/279
(58) Field of Classification Search ............. 264/277, 264/278, 279
See application file for complete search history.

(56) References Cited

U.S. PATENT DOCUMENTS

| 3,648,768 A | 3/1972 | Scholl .................. 165/171 |
| 3,841,938 A | 10/1974 | Grosse-Holling et al. ... 156/293 |
| 4,060,070 A | 11/1977 | Harter .................. 126/271 |
| 4,312,687 A | 1/1982 | Sigworth, Jr. ............. 156/245 |
| 4,352,772 A | 10/1982 | Bezner .................. 264/229 |
| 4,740,344 A | 4/1988 | Wollbeck et al. ........... 264/248 |
| 4,848,801 A | 7/1989 | Grabowski ............... 285/21 |
| 5,467,818 A * | 11/1995 | Buckley, Jr. .............. 165/178 |
| 5,469,915 A | 11/1995 | Cesaroni ................ 165/171 |
| 5,499,676 A | 3/1996 | Cesaroni ................ 165/166 |
| 6,038,768 A | 3/2000 | Rhodes ................ 29/890.043 |
| 6,056,559 A | 5/2000 | Olson .................. 439/108 |

* cited by examiner

*Primary Examiner*—Michael C. Miggins
(74) *Attorney, Agent, or Firm*—James C. Lydon

(57) ABSTRACT

An overmolding insert includes a base having at least one opening in a first surface, the opening communicating with a second surface opposite the first surface, at least one hollow projection extending from the first surface, the hollow projection having a first opening communicating with the opening of the first surface and a second opening located at a terminal portion of the hollow projection, the insert further having two opposed side walls, each side wall being joined to the first surface, two opposed end walls being joined to an opposite end of the first surface and extending from one side wall to the other side wall. The side walls, the end walls, and the first surface define a partially closed space, with the terminal portion of the hollow projection extending beyond the partially closed space.

4 Claims, 13 Drawing Sheets

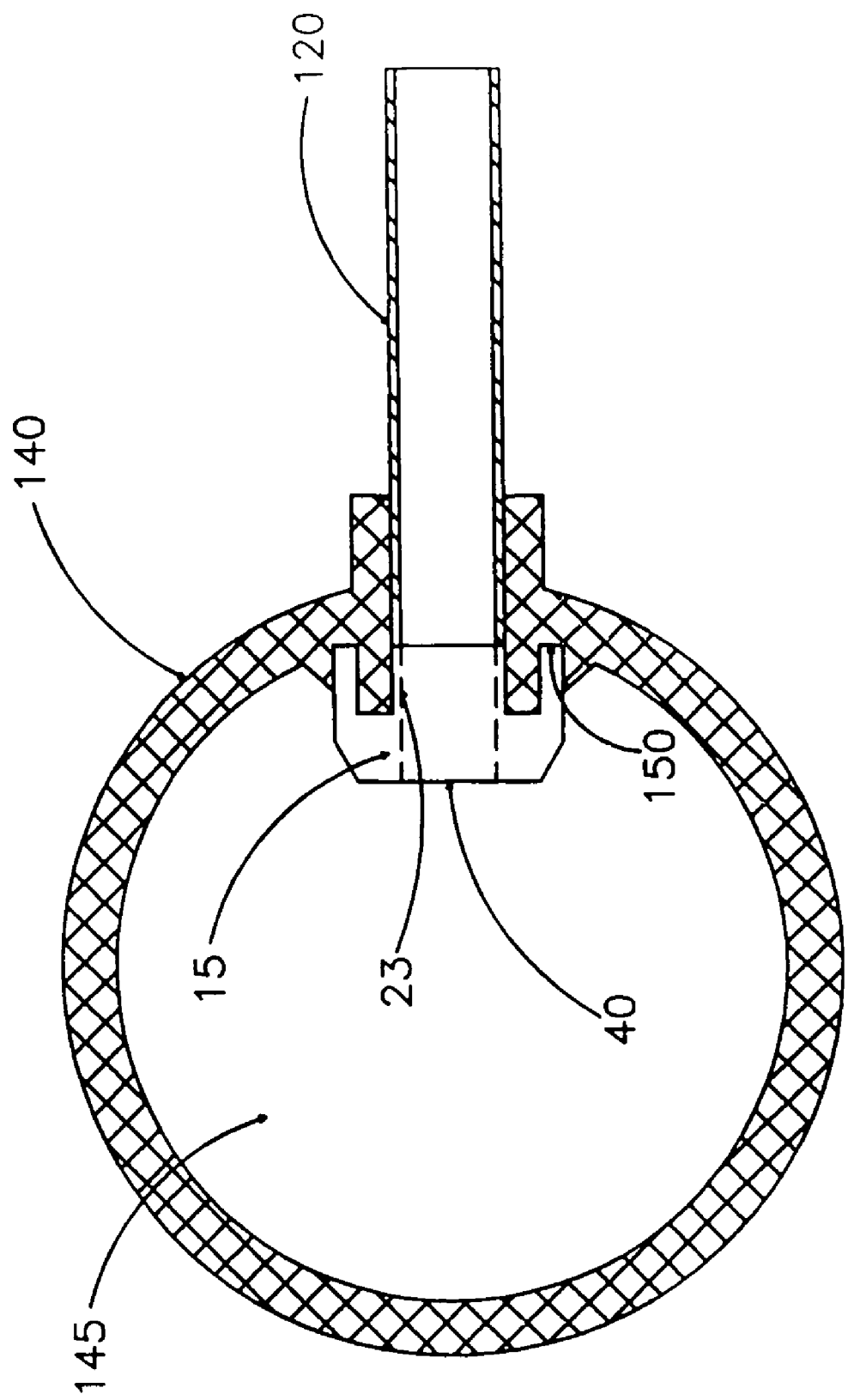

OVERMOLDING INSERT FOR HEAT EXCHANGER, PROCESS FOR MANUFACTURING A HEAT EXCHANGER, AND HEAT EXCHANGER PRODUCED THEREBY

This application is a division of application Ser. No. 10/135,368, filed May 1, 2002, now U.S. Pat. No. 6,787,116 which claims the benefit of U.S. provisional application No. 60/287,726, filed May 2, 2001.

BACKGROUND OF THE INVENTION

Polymeric heat exchangers are commonly used in a variety of applications and are made using a variety of manufacturing techniques. Each of these techniques tends to produce products having a unique set of attributes that render them to be either more or less effective relative to any given specific application. Common to them all is the desire for exceptionally strong, leak proof joints.

One such common application is their use as solar collectors for heating swimming pools. This type of heat exchanger is predominantly made of a thermoplastic polypropylene copolymer, especially stabilized for outdoor usage. Some are also made of a thermoset ethylene-propylene diene based polymer.

Solar collectors basically comprise a plurality of hollow conduits in a coplanar orientation joined between hollow manifolds that are located at each of the hollow conduit ends. The hollow conduits are made by extrusion processing, and are preferably, though not always, made in a circular cross-section or tubular form. Common constructions include closely spaced individual tubes and tube mats that comprise a plurality of tubes joined together, either directly side to side, or through an interconnecting web. Depending upon the manufacturing technique used, the manifold inlets to the tubes of common collector constructions can be either fully open relative to internal tube size, or in some way constricted.

To solar heat in-ground swimming pools, a constricted inlet is desirable. This is because all solar heating systems for in-ground pools require a multiplicity of collectors installed manifold end to manifold end. As the number of collectors in such a continuous array increases, water flow through the last collector in the array relative to the first becomes more and more reduced with increasing length of the array. Those constructions having fully open inlets to each and every tube directly off the manifold start to have performance impairing flow uniformity problems once the array goes beyond a very few collectors. Those constructions having some form of flow constriction achieve superior flow uniformity throughout the array and consequently superior heating performance. Some constructions have constrictions positioned at each and every tube end. This approach has been found to be highly effective for array lengths typically used in residential pool systems.

Other solar collector constructions constrict flow by including a subplenum. A subplenum is a separate chamber secondary to the main manifold chamber. On the tube side of this secondary chamber are a multiplicity of openings that communicate with each and every tube inlet. On the manifold side are more widely spaced and fewer openings. Because the main manifold has fewer openings, the flow reduction along an extended array can be significantly reduced. The subplenum serves as a distribution chamber, uniformly distributing water to the tubes, itself being uniformly fed by the main manifold.

The subplenum technique is capable of achieving the least amount of flow reduction, which is especially beneficial in very long arrays. It also creates excessive back pressure if the array length is short relative to the degree of manifold constriction designed into the collector. Since the very long arrays necessary to adequately realize the advantage of the subplenum technique are rarely encountered in solar heating residential swimming pools, the subplenum technique does not provide any real value in such an application.

Therefore, it can be seen that both the fully open inlet and the subplenum type constricted inlet are not so much a part of the construction of common residential swimming pool heating collectors because of what they bring to the application. They are there because they are a necessary part of the construction technique used to make the collector. However, applications exist where each of these inlet configurations individually excels. The fully open inlet construction excels whenever a thermally induced siphon flow is desired. The subplenum type constricted inlet excels whenever extremely long arrays are desired. Ideally the inlet configuration should match the application and not be dictated by the manufacturing technique.

For heat exchangers not involving solar energy, it is often desirable to have a multiplicity of planes of coplanar individual tubes or tube mats that are joined into common manifolds. This serves to greatly expand the effective heat exchange area serviced by the common manifolds. Such constructions are useful for a great many types of heating and cooling applications, wherein the non-corrosive characteristics of polymeric materials are desired. Common polymeric thermoplastic materials of construction include polypropylene, polyvinylidene fluoride (PVDF), and copolymers of polytetrafluoroethylene(FEP, PFA, ETFE, ECTFE, etc).

Whatever the application, the integrity of the joint between the hollow conduit ends and the hollow manifold of a heat exchanger is of key concern, as is the cost to make it. In the generic overmolding method for making this joint, a plurality of thin wall hollow conduits, which are internally supported by mandrels, are clamped into a mold. Molten plastic fills a hollow cavity surrounding the hollow conduits to form a common hollow manifold around the hollow conduits. The integrity of the joint depends upon the degree of bonding obtained at the interface between the manifold and the conduit.

U.S. Pat. No. 4,352,772 describes such a generic overmolding process in which hollow conduit supporting mandrels extend from an internal manifold core around which the manifold forms. The supporting mandrels and the manifold-forming core are removed at the end of the molding cycle. The process only makes fully open, non-constrictive tube inlets, which are not desirable for the extended array collector systems common to in-ground pool heating needs. Furthermore, the stated objective was to obtain a joint having a mechanical strength equal to the strength of the base materials. This disclosure acknowledges the use of high temperatures and pressures to obtain it, although it does not identify what they are. Through years of observation of the field experience of solar collectors made using this technique, it is apparent that such a bond is neither equal to the strength of the base materials nor sufficiently strong for the application. Indeed, two separate manufacturers using this generic overmolding method have both resorted to enlarging the open internal mold cavity in the area surrounding the hollow conduits in an apparent attempt to reinforce the strength of a joint which had proved itself to be inadequate during initial usage. Experimentation with this method revealed that polypropylene copolymer molded at normal injection molding melt temperatures of 450–480 degrees F. achieved no bonding. It was found that melt temperature is the key variable and had to be in excess of 500 degrees F. to observe what even can begin to be called a bond to start to form. It is known to those skilled it the art, that such high melt temperatures deteriorate the toughness and weld line integrity of molded articles, as well as makes it more difficult to limit flashing. The weld line integrity is a particularly important issue. Within the normal range of molding melt temperatures, weld line integrity increases with increasing melt temperature. However, in going above the normal range, decomposition of the molecular chains predominates, and weld line integrity decreases with further increasing melt temperature at a rapidly accelerating rate. The generally accepted rule of thumb is that the rate of decomposition doubles, with each 10 degree C. (18 degree F.) incremental increase in temperature. One needs only to understand that decomposition begins to take place at temperatures far lower than normal injection molding melt temperatures, to quickly appreciate the degree of rapid acceleration on decomposition rate that had already been steadfastly doubling to that point.

U.S. Pat. No. 4,740,344 discloses an overmolding process in which the hollow conduits, supported by removable mandrels, are inserted into openings along the floor of an insert. This assembly is clamped within a mold, the tube ends are preheated to an elevated temperature below the melting temperature of the tube material, and molten plastic is injected into a cavity formed by the mold, the insert, and the tube ends. The initially elevated tube temperature boosts the ability of the molding melt to more greatly reduce tube surface viscosity, thus improving spreading and improving conformance to the overmolded molten plastic surface, and hence providing superior bonding. Unfortunately, the tube preheating operation is counterproductive to high volume production of polymeric commercially viable solar collectors.

An object of the present invention is to provide a heat exchanger having an improved bond between its manifold and its hollow conduits due to increased interfacial contact between the hollow conduits and the overmolding plastic that forms the manifold.

Another object of the present invention is to provide an overmolding process that achieves an improved bond without resorting to higher than normal injection molding temperatures or preheating the inserted conduits.

Another object of the present invention is to provide a heat exchanger with manifold-to-conduit inlets that can be selectively configured either fully open or partially constricted to achieve optimum performance in either pumped or thermally induced siphoned flow systems.

Another object of the present invention is to provide a heat exchanger with manifold-to-conduit inlets that can be selectively constricted either at each and every tube inlet or using the subplenum technique, or both.

An advantage of the heat exchanger of the present invention is that it is better able to withstand the thermal and mechanical stress exerted upon it during operation than known heat exchangers.

Another advantage of the heat exchanger of the present invention is that it adds an additional highly developed thermally fused seal within the interior chamber of the manifold that completely encapsulates the area where the hollow conduits penetrate through the manifold wall.

An advantage of the overmolding process of the present invention is that it permits efficient, low cost manufacturing of solar collectors having improved, water-tight interfacial bonds between the hollow conduits and the manifold wall.

Another advantage of the overmolding process of the present invention is that it permits efficient, low cost manufacturing of heat exchangers, whereby the hollow conduits may be positioned on multiple planes, extending the effective heat transfer area serviced by the manifolds.

Another advantage of the overmolding process of the present invention is that it is adaptable to low cost manufacturing of polymeric heat exchangers that can be selectively configured to suit a wide variety of applications.

SUMMARY OF THE INVENTION

In one aspect, the present invention relates to an overmolding insert, comprising:

a base having at least one opening in a first surface, the opening being in communication with a second surface opposite the first surface, at least one hollow projection extending from the first surface of the base, the hollow projection having a first opening in communication with the opening of the first surface and a second opening located at a terminal portion of the hollow projection, the insert further comprising two opposed side walls, each side wall being joined to the first surface, two opposed end walls being joined to an opposite end of the first surface and extending from one side wall to the other side wall, such that the side walls, the end walls, and the first surface define a partially closed space, with the proviso that the terminal portion of the hollow projection extends beyond the partially closed space.

In another aspect, the present invention relates to a heat exchanger, comprising a plurality of hollow conduits each having a first end and a second end;

a first manifold connected to the first end of each conduit;

a second manifold connected to the second end of each conduit;

wherein at least one of the first and second manifolds is joined around the conduit ends and at least one overmolding insert such that a hollow conduit is fitted either over or against a hollow projection.

In yet another aspect, the present invention relates to a process for manufacturing a heat exchanger manifold, comprising a) inserting at least one overmolding insert into a mold;

b) fitting at end of at least one hollow conduit over at least one hollow or removable projection, and c) molding molten polymeric material around the overmolding insert and the hollow conduit to form a manifold.

BRIEF DESCRIPTION OF THE DRAWINGS

FIG. 8A is a cross-section of a manifold that has been overmolded over a sub-assembly using the overmolding insert shown in FIG. 1A and removable hollow conduit supporting mandrels.

DETAILED DESCRIPTION OF THE PREFERRED EMBODIMENTS

Figure 1:
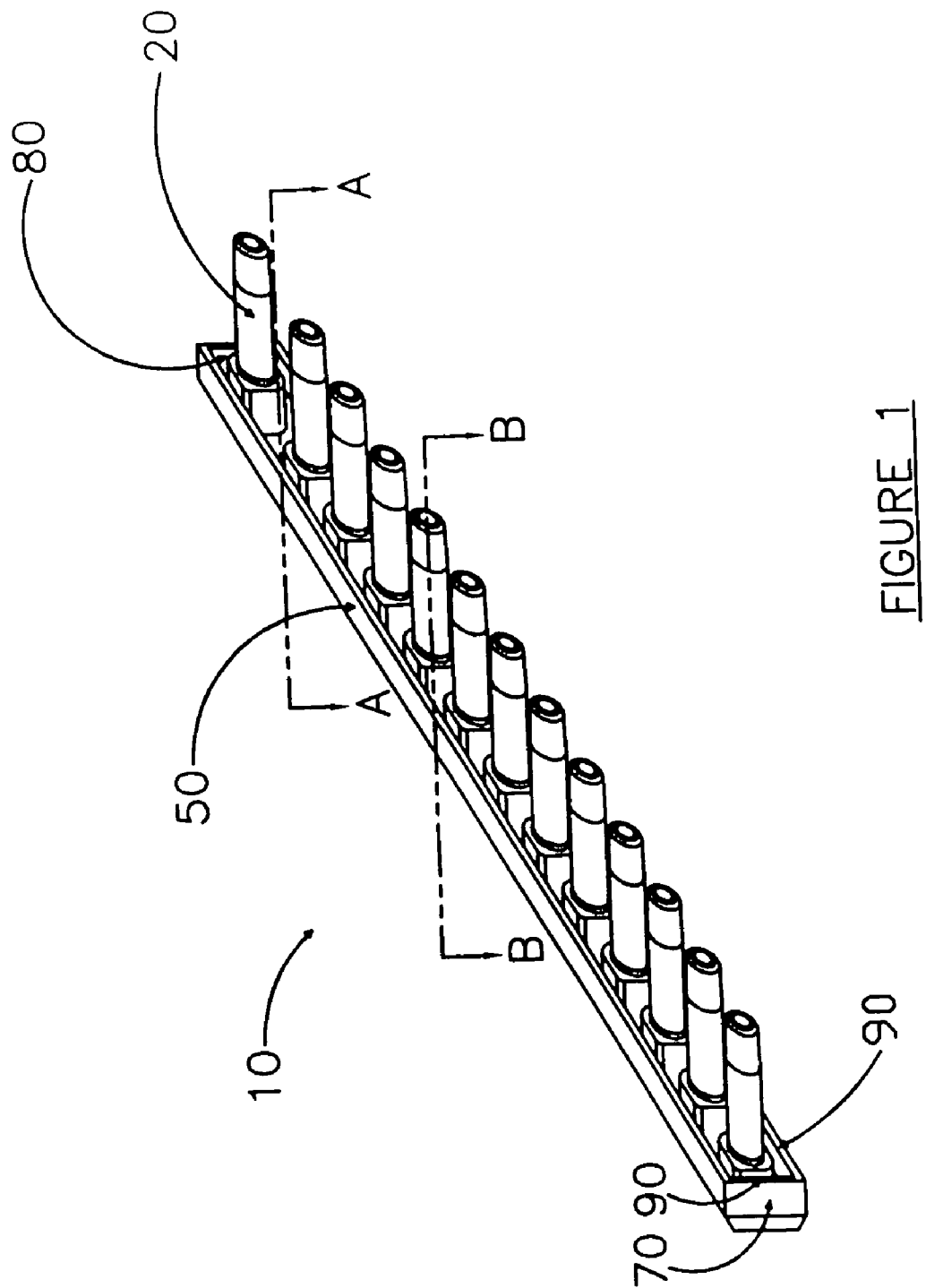
FIG. 1 is a top elevation view of an overmolding insert of the invention intended to provide a constricted inlet at each and every hollow conduit junction with the manifold.

The present invention is generally applicable to heat exchangers. It will be disclosed in detail in the context of solar collectors, a type of heat exchanger in which heat energy from the sun is collected and transferred to water circulating there-through. However, before turning to the preferred solar collector embodiments, it is believed that comprehension of the invention will be aided by the inventors' current belief concerning the theory of operation of their invention.

Without intending to be bound thereby, the inventors currently believe that the interfacial bond strength at an overmolded interface between two thermoplastic surfaces depends strongly upon the degree to which the temperature of the interfacial surface is raised during the overmolding process.

Interfacial bonding between non-polar crystalline thermoplastic materials, such a propylene copolymer, is developed by Van der Waals' forces. These forces arise from continuous natural electron movement creating a combination of momentary dipoles and induced dipoles that act between different portions of different molecules that are in extremely close contact. At such very small distance all surfaces are extremely irregular, having pores and crevices. This is even true of a polymer melt front under pressure.

The viscosity of thermoplastic polymers decreases with increasing temperature above their melting point. Eventually, their viscosity is reduced to a point that enables these thermoplastic polymers to more thoroughly spread into the pores and crevices of surfaces they contact. When both contacting surfaces are thermoplastic and are raised sufficiently above their melting temperature, the thermoplastic materials can mutually spread into the pores and crevices of the opposing surface, thereby creating a strong bond between the two thermoplastic materials.

Thermoplastic materials come in a great variety of average molecular weight and molecular weight distributions. These two parameters define how well the molten polymer will spread at a given temperature. Hot melt adhesives are thermoplastic materials which have low molecular weight, which gives them the ability to thoroughly spread over and into the microscopic pores and crevices of solid surfaces. To achieve adequate physical properties in molded articles, the molecular weight must be relatively high, which unfortunately results in a reduced ability to effectively spread over and into solid surfaces, without undesirably high processing temperatures.

Without intending to be bound by theory, the inventors currently believe it is necessary to have a co-conforming or co-spreading condition between the mating surfaces when molding materials appropriate for the molding of a manifold. Therefore, a manifold overmolding process is intended whereby the exterior surface temperature of the tubes contacted by the overmolding molten plastic is sufficiently raised so that the exterior surface melts to a point where its viscosity is decreased to where it spreads over and into the surface of the overmolding mass of molten plastic, which likewise is spreading over and into the exterior tube surface. The area of interfacial contact satisfactory for the effective operation of van der Waals forces is then largely dependent upon the extent to which the exterior surface of the member inserted into the mold is not only melted but reduced in viscosity.

The overmolding insert of the present invention is designed to insulate a portion of the molten polymer forming the manifold from the relatively cold mold core. More particularly, the base of the overmolding insert serves to insulate the portion of the molten polymer that enters the partially closed space of the overmolding insert from the mold core.

In addition, the overmolding insert is designed to include specific segments that are extremely vulnerable to localized melting, and to heating above the thermoplastic material's melting point, in order to provide reduced viscosity and enhanced spreading of the insert's polymeric material over and into the surface of the overmolding molten polymer. During the overmolding operation, molten polymer surrounds the terminal segments of the overmolding insert walls on three sides. A significant amount of heat is absorbed by the terminal segments from the surrounding molten polymer, resulting in rapid, localized melting of the terminal segments to produce a melt of thermoplastic material. The viscosity of this melt decreases as its temperature continues to increase. The thermoplastic polymer of the localized melt can more thoroughly spread into the pores and crevices of the molten polymer forming the manifold, and vice versa. An intimate, strong bond between the molten polymer forming the manifold and the localized melt of the overmolding insert results.

A preferred embodiment of the overmolding insert of the present invention is illustrated by FIGS. 1, 2, 3 and 4. As shown in FIG. 1, the overmolding insert 10 includes a closed U-shaped channel having a plurality of hollow projections 20 extending therefrom. The dimensions of the overmolding insert will generally be determined by the dimensions of the manifold to be formed around the insert. As discussed in greater detail herein below, two or more overmolding inserts can be used in the manufacture of a single manifold.

As disclosed above, the overmolding insert includes a base having at least one opening in a first surface, the opening being in communication with a second surface opposite the first surface. See FIG. 2, where base 30 is illustrated with a plurality of coplanar holes 40 spaced along its longitudinal axis.

Figure 3:
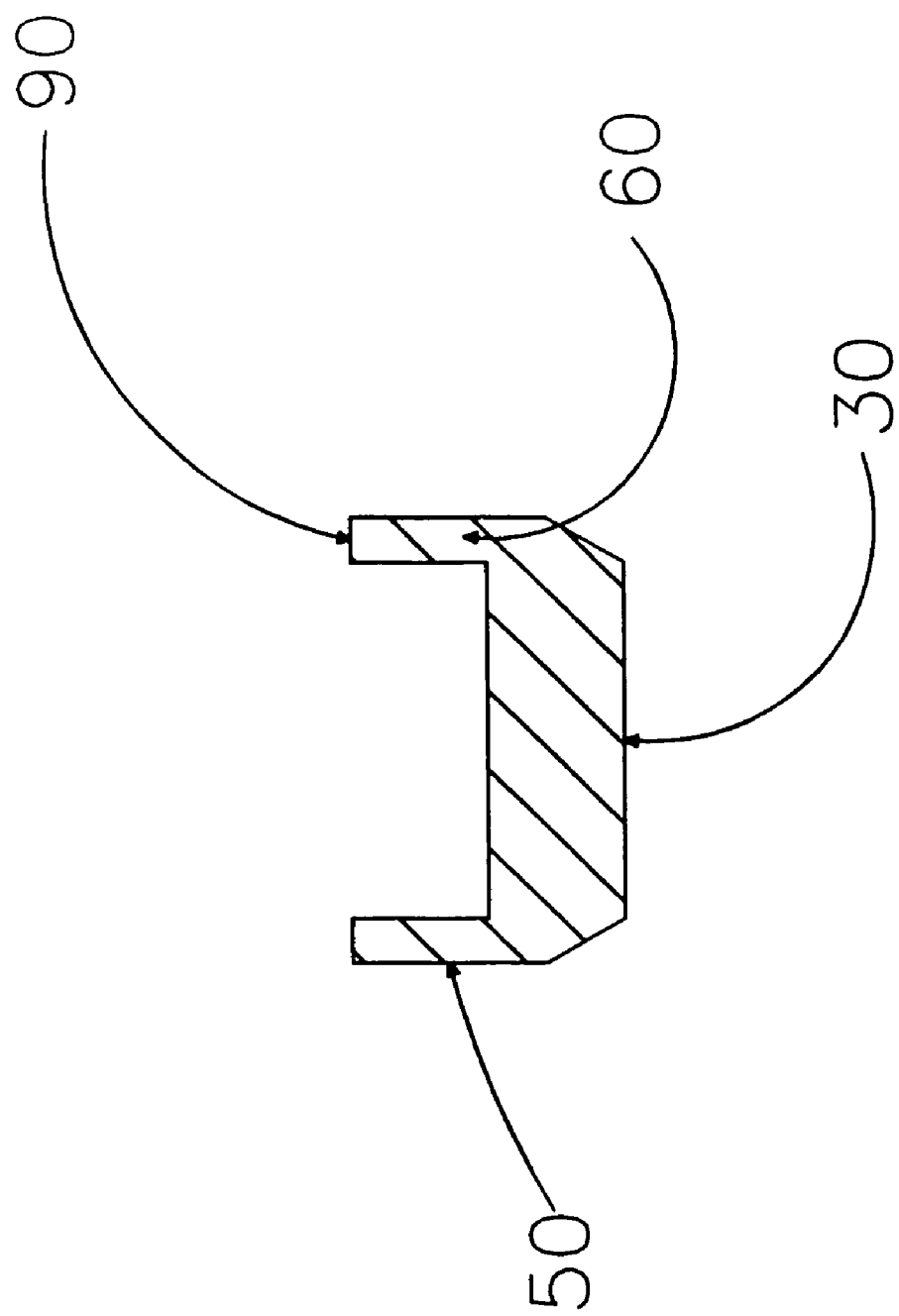
FIG. 3 is a cross-section of the overmolding insert shown in FIG. 1 through line A—A.
Figure 4:
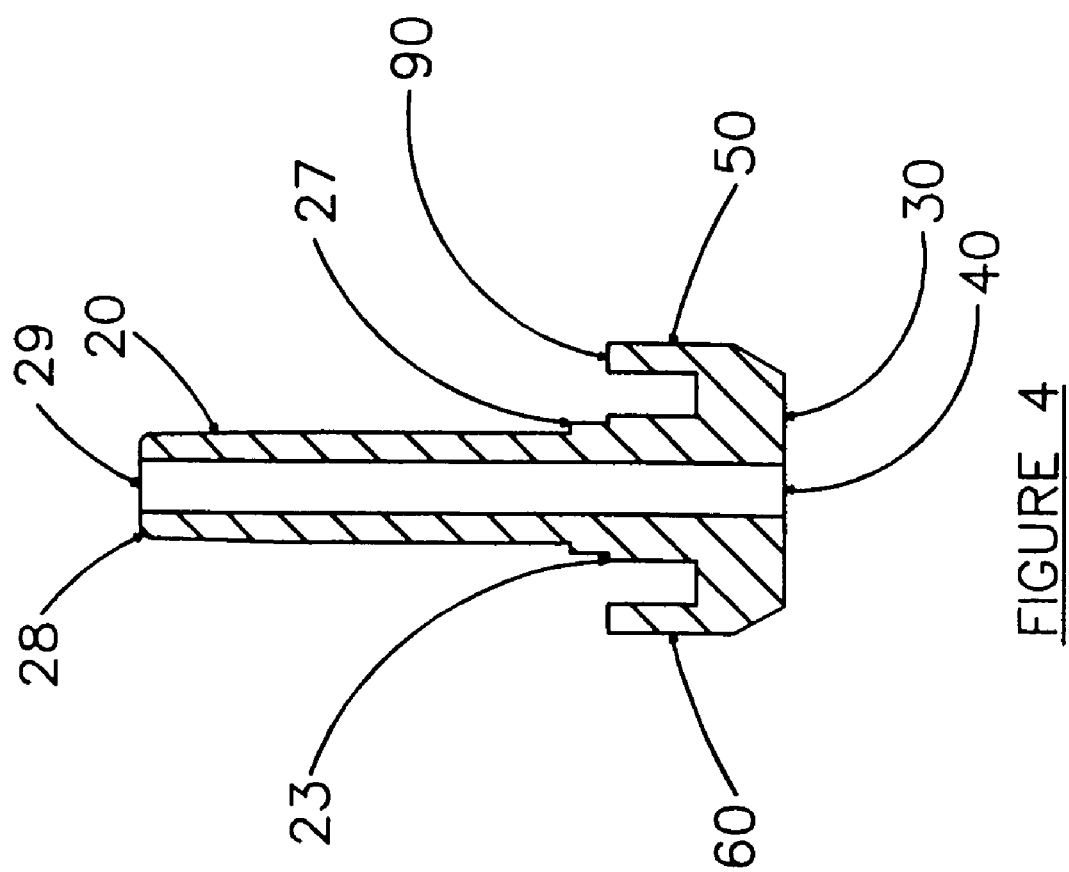
FIG. 4 is a cross-section of the overmolding insert shown in FIG. 1 through line B—B.

The overmolding insert has a partially closed space which is defined by the first surface of the base, the side walls and the end walls. One embodiment of the partially closed space is a closed U-shaped channel. This is shown in FIGS. 3 and 4, where a U-shaped channel is formed by base 30 and parallel side walls 50 and 60. Each side wall is the same length and height and is joined to base 30, which has the same length as side walls 50 and 60.

As shown in FIG. 1, the U-shaped channel of the overmolding insert is closed by two parallel end walls 70 and 80 which have the same height as the side walls. Each end wall is joined to an end of a U-shaped channel formed by base 30 and parallel side walls 50 and 60, extending from side wall 50 to side wall 60.

Hollow projections 20 each extend from the same side of base 30 as the side walls and the end walls. As shown in FIG. 4, each hollow projection 20 communicates with a hole 40 of base 30, and each hollow projection 20 has a terminal portion which extends beyond the partially closed space, i.e., hollow projection 20 has a length greater than the height of the side walls 50 and 60. Preferably, the length of the hollow projections 20 should be sufficient to extend beyond the wall of a manifold overmolded around it, as disclosed more fully herein below.

Hollow projections 20 may be in a variety of shapes, feature a multiplicity of shapes at various positions, and may have an extended cylindrical diameter that permits the end of a hollow tube to be placed over its terminal portion.

Hollow projections 20 may contain or wholly form a base abutment 23 which is located adjacent to base 30 and which has a larger outside diameter than the outside diameter of hollow projection 20 or hole 40. Base abutment 23 is preferably square.

The base abutments serve to establish the location of the ends of the hollow conduits relative to the manifold wall. The base abutments also serve to reduce the volume of the partially closed space, and thus the amount of hot molten polymer that can occupy it during the overmolding operation. The base abutments also provide additional insulation from the relatively cold mold core.

Hollow projections 20 may additionally have a circular step 27 located adjacent the abutment to provide a better seal between the insert and a hollow tube end placed over it. Circular step 27 has an outside diameter greater than the inside diameter of the tube end, and thus also expands the outer diameter of the portion of the hollow conduits which are inserted over circular step 27. This expansion serves to individually lock the hollow conduits within the overmolded mass that forms the manifold wall.

As shown in FIG. 4, hollow projection 20 may also have a taper 28 at the end 29 opposite base 30 of the U-shaped channel to aid in the placement of the ends of the hollow conduits.

The overmolding insert is preferably made of fiber reinforced polymeric material because it provides added strength to resist crushing during the overmolding process. Glass fiber reinforced ethylene-propylene copolymer is preferred, and is commercially available from A. Schulman Co. Although it is desirable to avoid the use of removable supporting mandrels, one of ordinary skill in the art will readily understand that their use to further reinforce the hollow projections is permissible with this design.

The partially closed space of the overmolding insert is important to formation of a strong bond between the hollow conduits and the manifold formed during the overmolding operation. Molten polymer fills the partially closed space of the overmolding insert during the overmolding operation. Base 30, side walls 50 and 60, and end walls 70 and 80 serve to insulate the molten polymer from the relatively cold mold core. The temperature of the molten polymer is not reduced as quickly, and thus a correspondingly greater thermal input is delivered to terminal segment 90 of the overmolding insert.

The presence of the molten polymer in the partially closed space of the overmolding insert provides additional thermal input to terminal segment 90 of the overmolding insert over and above the heat providing by molten polymer in contact with the outside surfaces of side walls 50 and 60, and end walls 70 and 80. Accordingly, a significantly greater amount of thermal energy is available to rapidly heat both the thermoplastic material of the overmolding insert and the hollow conduits above their melting point, at all surfaces wetted by the overmolding molten plastic. This permits formation of a strong bond between the overmolded manifold and the exterior surface of the hollow conduits at molding temperatures well within the normal processing range.

A second feature of the overmolding insert also enhances localized heating, and thus superior bonding between the thermoplastic material of the overmolding insert and the molten polymer forming the manifold. As illustrated by FIG. 3, the end walls and side walls of overmolding insert 10 each have a terminal segment 90 located opposite to where the side walls and end walls join base 30. Terminal segment 90 is designed to be vulnerable to rapid melting upon contact with molten polymer. During the overmolding process, molten polymer surrounds terminal segment 90 on three sides, rapid heat input relative to the rate of heat dissipation causing rapid melting of the thermoplastic material of the overmolding insert, with significant, localized viscosity reduction. A strong melt-to-melt fusion bond between the molten polymer forming the manifold and the overmolding insert results, forming an exceptionally strong seal that completely surrounds the entire perimeter of the interfacial area between the hollow conduits and the manifold wall. It is significant to note that this constitutes an additional seal that the prior art overmolding process does not provide. It is also significant to note that this added seal is both exceptionally strong, and is located at the interior of the manifold where it is less vulnerable to damage.

The side and end walls of the overmolding insert should be sufficiently thin to permit rapid heating and melting of their terminal segment 90 during the overmolding operation. An appropriate wall thickness will depend on several factors, including the type of polymer material and the molding temperature and pressure. In this regard, an illustrative wall thickness will range from 0.035 to 0.075 inch, most preferably 0.050 inch.

The overmolding insert may be made using well known techniques and apparatus. For example, the overmolding insert can be manufactured in a single operation using a commercially available molding machine and an appropriate mold. Manufacturing conditions such as molding temperature, pressure and cycling time will depend on the specific polymer, mold and molding machine used, and can easily be determined by one of ordinary skill in the art without undue experimentation.

The overmolding insert can be used to make an improved heat exchanger that includes:

a plurality of coplanar hollow tubes;

a first manifold connected at one end of each tube;

a second manifold connected at the opposite end of each tube;

wherein at least one manifold is joined to the tubes through at least one overmolding insert which has been overmolded into the manifold wall. The partially closed space of the overmolding insert will be filled with polymer forming the manifold, and will be located within the external circumference of the manifold, and preferably embedded within the manifold wall.

Figure 9:
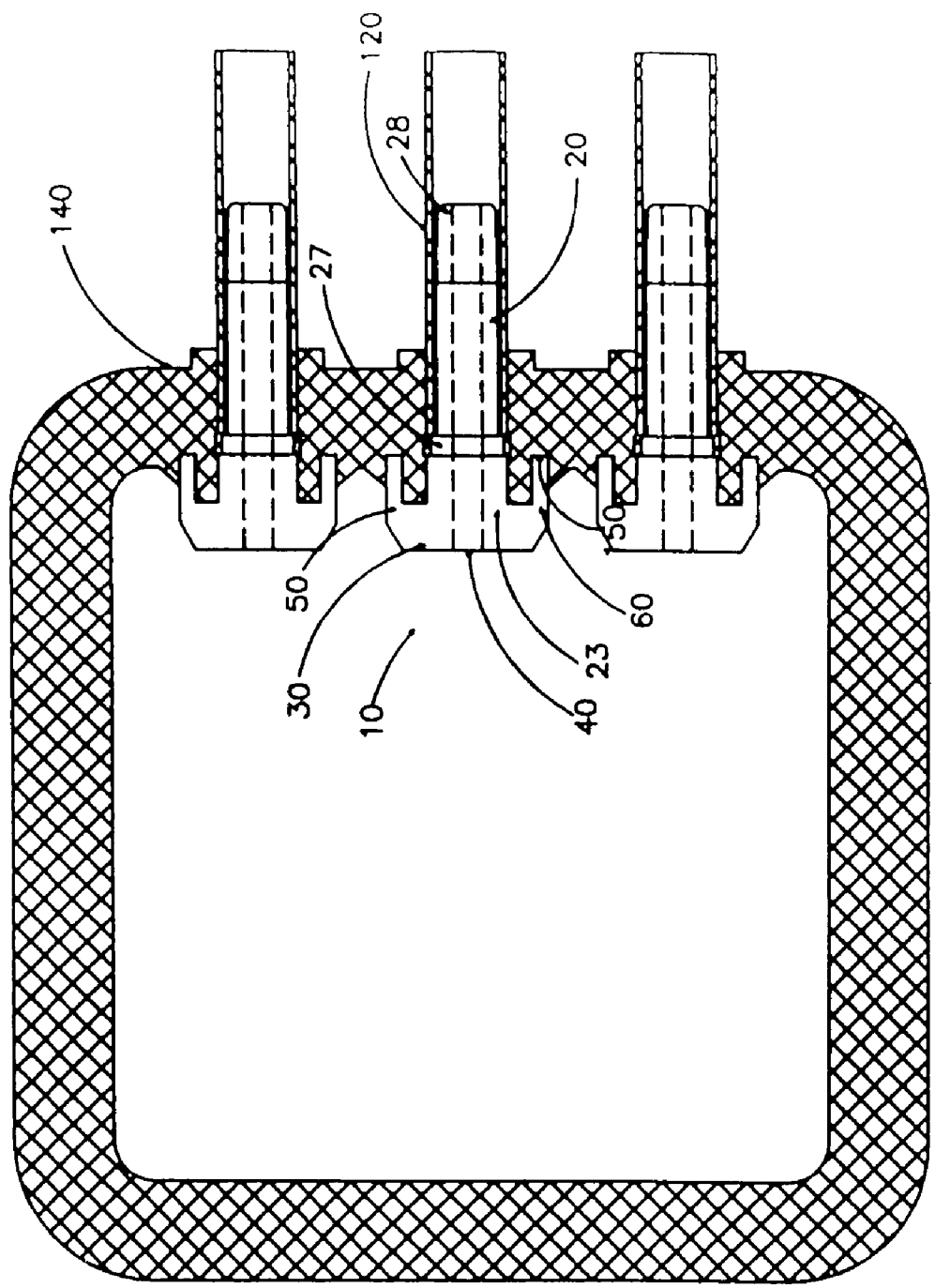
FIG. 9 is a cross-section of a manifold that has been overmolded over a multiplicity of the sub-assembly shown in FIG. 7.

The manifolds of the heat exchanger preferably have a circular cross-section. The cross-section of the hollow inserts of the overmolding insert will be determined by the cross-section of the hollow tubes. Accordingly, if the hollow tubes have a circular cross-section, the hollow inserts will have a circular, slightly smaller, cross-section to ensure a watertight seal between the hollow tube ends and the hollow inserts. It is possible to use just one overmolding insert per tube mat. Alternatively, several overmolding inserts may be placed end-to-end when the tube mat contains numerous hollow tube conduits, and may also be stacked one plane above the other to achieve greater heat exchange area being serviced by a single manifold, as shown in FIG. 9.

The manifolds and hollow tubes of the heat exchanger are preferably made of a polymeric material. In a particularly preferred embodiment, the manifolds are made of a glass fiber-filled, ethylene-propylene copolymer. This is highly effective in significantly reducing post molding shrinkage, and is especially beneficial for constructions having a great many hollow conduits aligned on a common plane. A copolymer polypropylene with 30–40% short glass fiber content exhibits only about one-fifth the mold shrinkage of the unfilled version.

Figure 6:
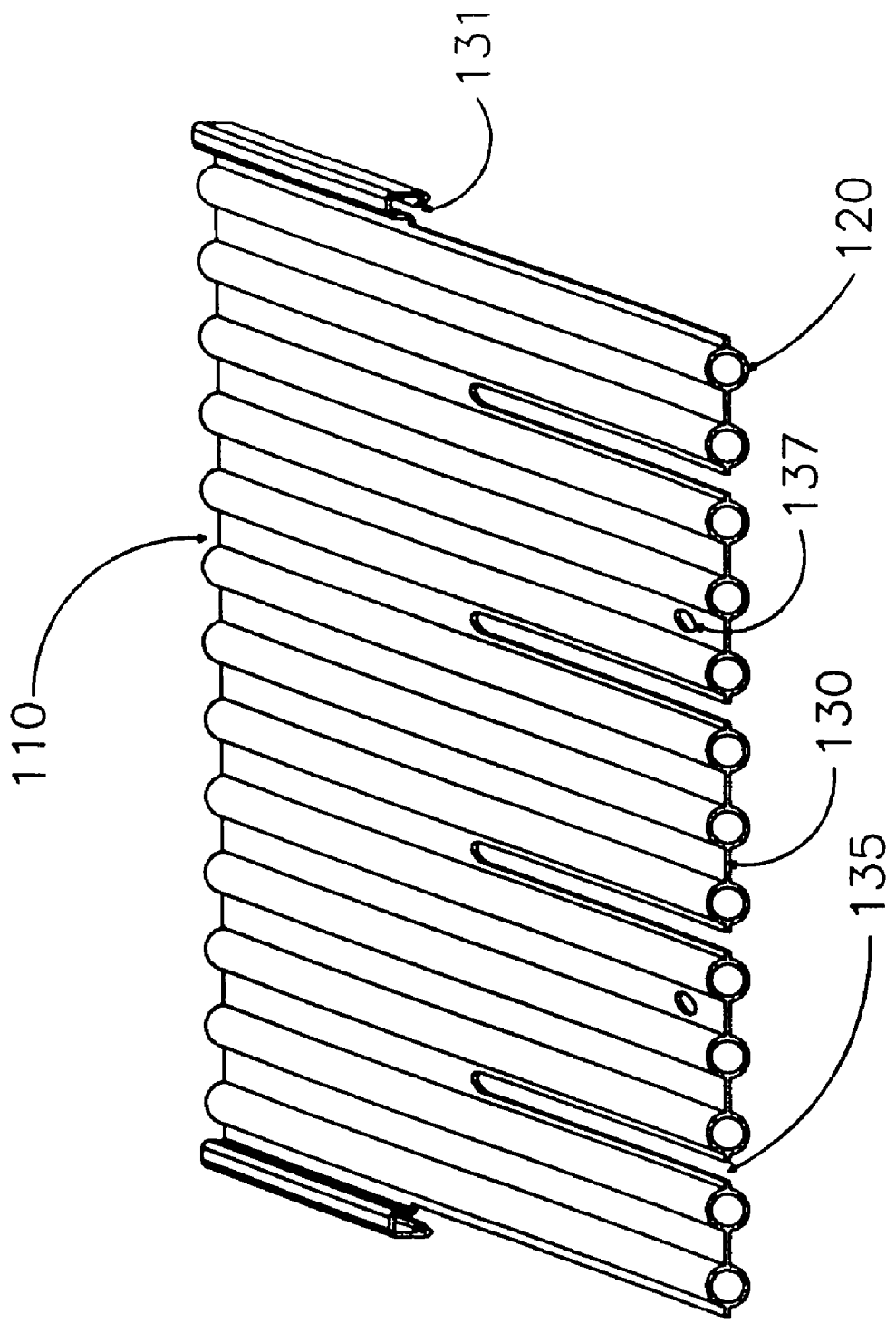
FIG. 6 is a top elevation view of a tube mat containing optional features that are useful in the various embodiments of the invention.

The hollow tubes or conduits are preferably joined together by a web to form a tube mat, as illustrated in FIG. 6. This greatly reduces process handling. In a particularly preferred embodiment, at least one portion of the web 130 located at an end of the hollow tube 120 is removed prior to the overmolding operation to form notch 135. The absence of web material at these notch locations permits the two melt fronts of the molten polymeric material being molded into a manifold to meet, thereby creating a melt-to-melt bond which is superior to a melt-to-solid bond found in the prior art when using tube mat construction. The notches also provide a non-obstructed flow path to fully fill the mold when manufacturing a heat exchanger having multiple planes of coplanar tube mats.

FIG. 6 also illustrates another preferred embodiment in which one or more holes 137 are provided by removing a portion of web 130 near the end of tube mat 110 adjacent the overmolding insert. During the overmolding operation, molten manifold material injected into the mold will fill and solidify within holes 137, thus mechanically locking the tube mat into the manifold. Forces acting to pull the tube mat out of the manifold cannot directly act to separate the bond between the hollow conduits contained within the tube mat and the manifold due to this mechanical attachment.

In a still more preferred embodiment, tube mat 110 can be provided with both holes 137 and notches 135 at an end of the tube mat which will be adjacent the overmolding insert.

More than one tube mat and more than one overmolding insert may be used to form a large heat exchanger array. The tube mats can be joined end-to-end using conventional means for attachment. FIG. 6 illustrates a tube mat attachment means 131, which is an interlocking member which functions to link a multiplicity of tube mats together. It will be noted that tube mat attachment means 131 does not extend the length of the tube mat to facilitate mold closure. In a less preferred embodiment, attachment means 131 may be a flat fin which overlaps and is bonded to a cooperating flat fin of an adjacent tube mat. Again, the flat fin tube attachment means preferably does not extend the length of the tube mat to facilitate mold closure.

Figure 7:
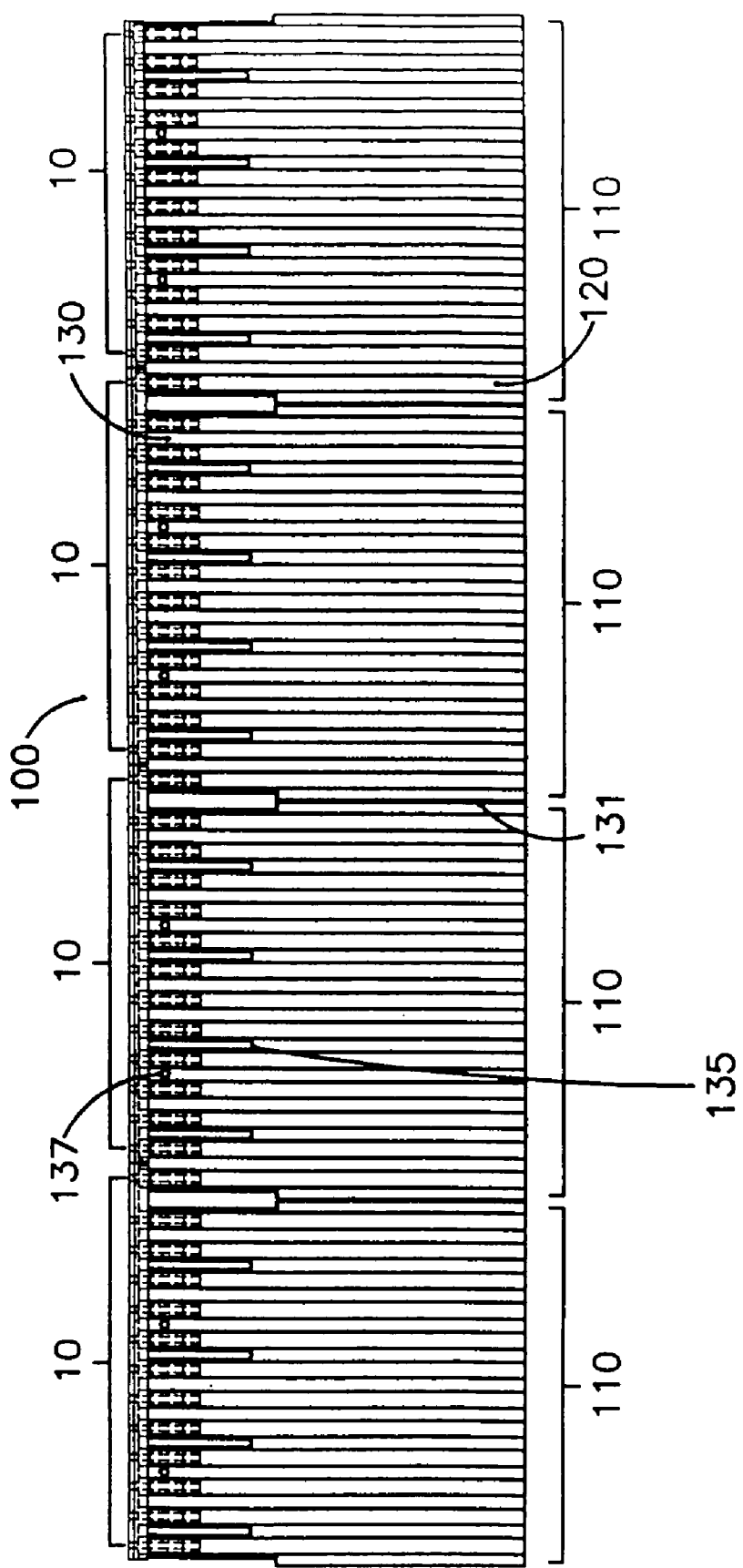
FIG. 7 is a top view of a plurality of tube mats as shown in FIG. 6, each tube mat being joined to an overmolding insert as shown in FIG. 1 to form a sub-assembly.

FIG. 7 illustrates a sub-assembly 100 in which a tube mat 110 has been mechanically joined to overmolding insert 10. As best shown in FIG. 6, tube mat 110 includes a plurality of hollow, co-planar tubes 120 joined to one another by web 130. The ends of tubes 120 are adapted to be placed over ends 29 of hollow projections 20 of the overmolding insert 10 of FIGS. 1, 2, 3 and 4. As shown in FIG. 7, notch 135 has been removed from web 130 adjacent overmolding insert 10, when formed into a sub-assembly 100. Holes 137 have also been provided in web 130 adjacent overmolding insert 10. Interlocking tube mat attachment means 131 are provided to attach a multiplicity of tube mats together.

During the overmolding operation, molten polymer is injected into a mold containing the overmolding insert and a portion of the tube mat attached to the overmolding insert to form a manifold. The molten polymer comes into intimate contact with terminal segment 90 of walls 50, 60, 70 and 80, and flows into the partially closed space defined by the walls 50, 60, 70 and 80 of the overmolding insert. This creates a "peninsula effect" in which terminal segment 90 is surrounded on three sides by molten polymer, which causes rapid melting of top surface 90 and permits melt-to-melt fusion and creates a primary, perimeter seal between the molten polymer and the overmolding insert. Additional melt-to-solid bonding occurs between the remainder of the overmolding insert and the molten polymer. The tube ends are compressed onto the hollow tube inserts of the overmolding insert during this overmolding operation.

Figure 8:
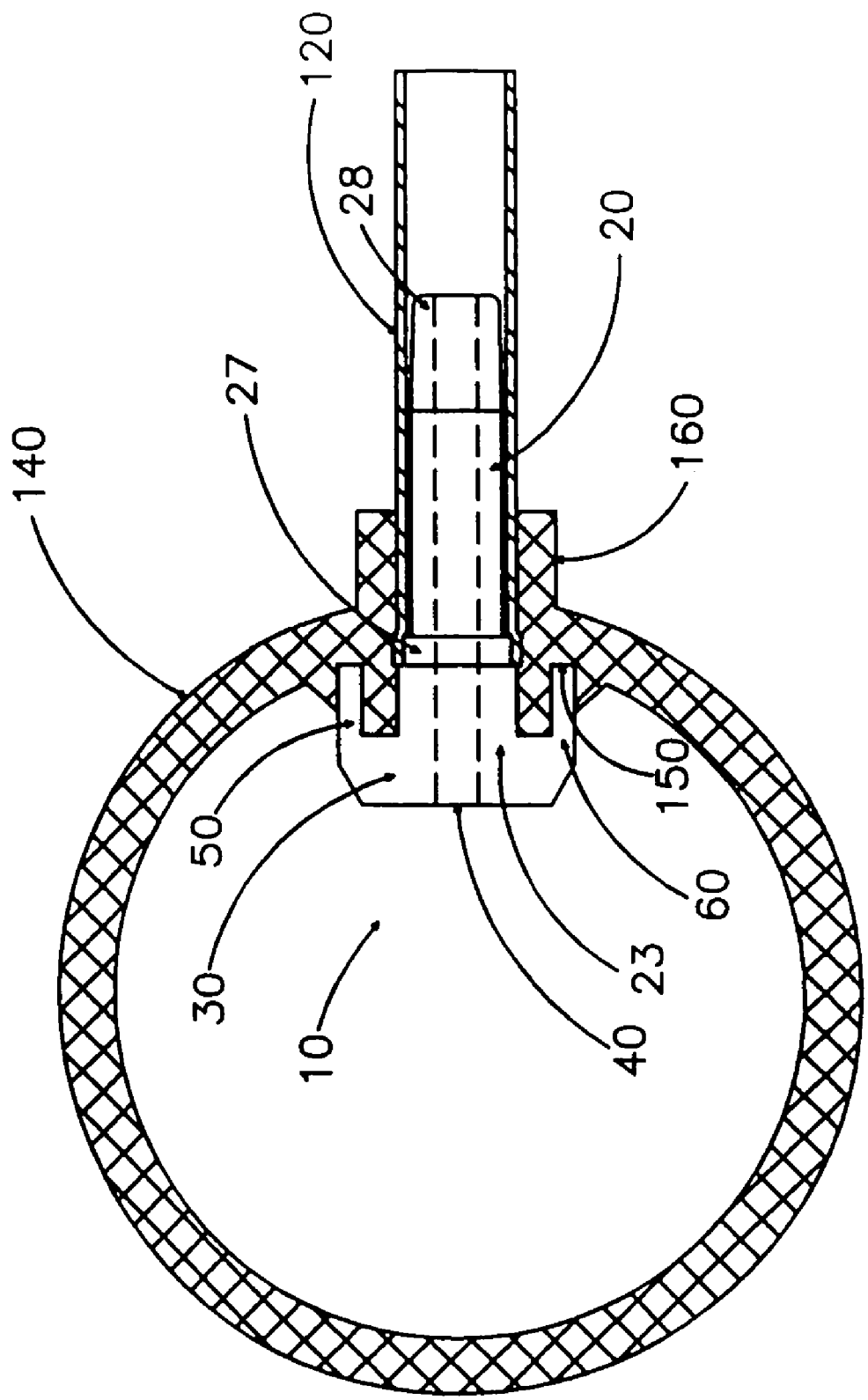
FIG. 8 is a cross-section of a manifold that has been overmolded over the sub-assembly shown in FIG. 7.

A cross-section of the resulting manifold is shown in FIG. 8. Circular hollow manifold 140 has been overmolded around sub-assembly 100 comprising hollow tube 120, whose tube end covers hollow projections 20 of overmolding insert 10. An important feature of the manifold is that the primary, perimeter seal 150 between the overmolding insert 10 (and thus the ends of tubes 120 of tube mat 110) and the manifold is located within the outer circumference of the manifold 140. Moreover, the primary, perimeter seal is located away from water flow, which reduces the possibility of leakage due to seal failure.

As shown in FIG. 8, the overmolded manifold 10 may further include an external melt block 160, which covers the ends of tube 120 joined to the overmolded manifold 140.

The hollow projections 20 of the overmolding insert prevent crushing or collapse of the hollow tube ends during the overmolding operation. Hollow projections 20 are not removed after the overmolding operation is completed, and have a smaller internal diameter than the internal diameter of the hollow tubes. The hollow projections thus create a slight back-pressure against the water flowing through the manifold during operation, and contribute to a more uniform distribution of water through all of the tubes in the tube mat. This is an especially important advantage when the heat exchanger is mounted in an array whereby the manifolds are connected end to end. In applications involving extremely long arrays it may be desirable to substantially increase the degree of constriction.

Figure 5:
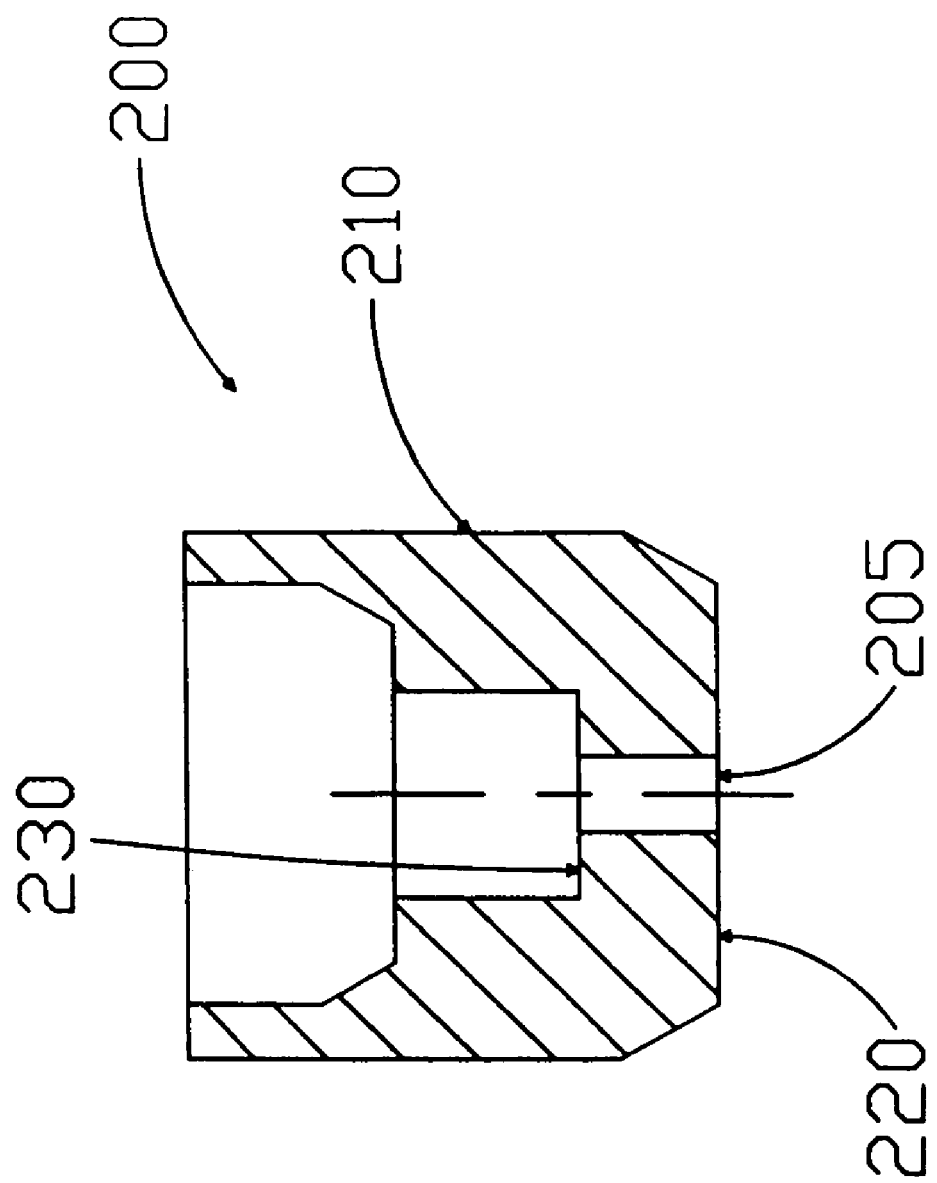
FIG. 5 is a cross-section of a subplenum adapter insert that, when assembled together with the overmolding insert of FIG. 1, forms a flow distribution chamber having constricted inlets at each and every hollow conduit junction to the manifold and a lesser number of openings to the internal manifold chamber.

Water flow through the heat exchanger can be constricted by means of a subplenum adaptor. FIG. 5 illustrates a subplenum adaptor 200 which may be used with the overmolding insert of the present invention. Subplenum adaptor 200 has a base 210 having at least one opening 205 in a first surface 220, said opening being in communication with a second surface 230 opposite first surface 220.

Figure 8B:
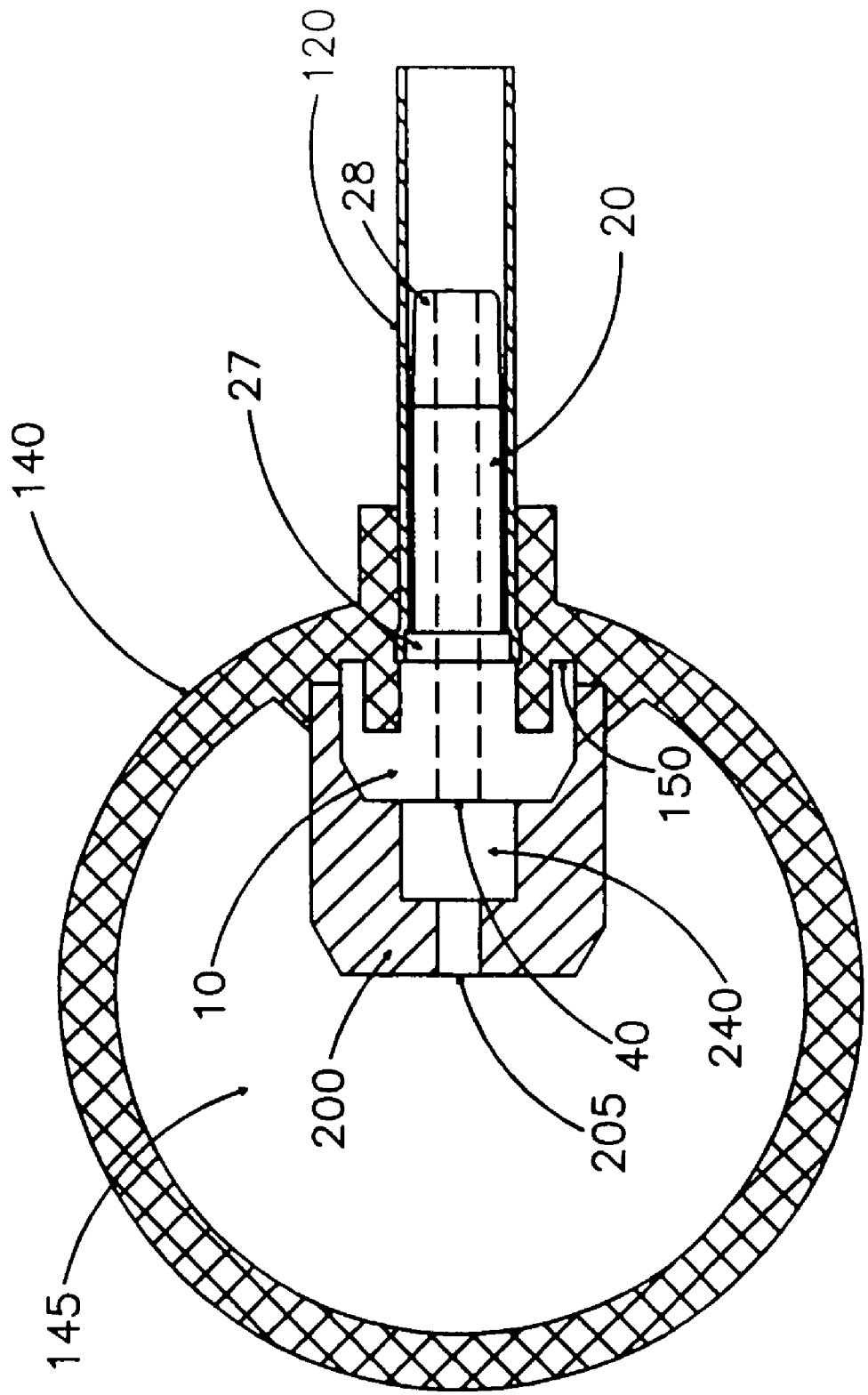
FIG. 8B is a cross-section of a manifold that has been overmolded over the sub-assembly shown in FIG. 7 inserted into the subplenum adapter insert shown in FIG. 5.

As shown in FIG. 8B, subplenum adaptor 200 may be inserted over base 30 of the overmolding insert to define an enclosed chamber 240 between them when a manifold is formed around them. The enclosed chamber 240 communicates with an internal space 145 of manifold 140 through a plurality of openings 205. Enclosed chamber 240 also communicates with the hollow conduits through a plurality of holes 40, such that the plurality of openings 205 have a smaller total area than the plurality of holes 40.

The heat exchanger of the present invention may be made using techniques and apparatus well known to those of ordinary skill in the art. For example, the heat exchanger can be manufactured by a process that includes the following steps:

a) inserting each of the hollow projections of a overmolding insert of the present invention into an end of a hollow tube to form a sub-assembly;

b) placing the sub-assembly into a mold; and c) molding molten polymeric material over the overmolding insert and tube ends to form a manifold. During the overmolding operation the tube ends are compressed onto the hollow projections of the overmolding insert to form a tight seal.

The overmolding step can be performed using a commercially available molding machine and an appropriate mold. Manufacturing conditions such as injection molding temperature, pressure and cycling time will again depend on the specific polymer, mold and injection machine used, and can easily be determined by one of ordinary skill in the art without undue experimentation.

While the invention has been illustrated in terms of a single tube mat heat exchanger, the invention is not so limited. FIG. 9 illustrates a manifold 140 having three tube mats attached one over another thereto. One of ordinary skill in the art will recognize that similar manifolds having 2 or 4 or more tube mats serviced by a single manifold at either end of the tube mat are well within the scope of this invention.

Figure 1A:
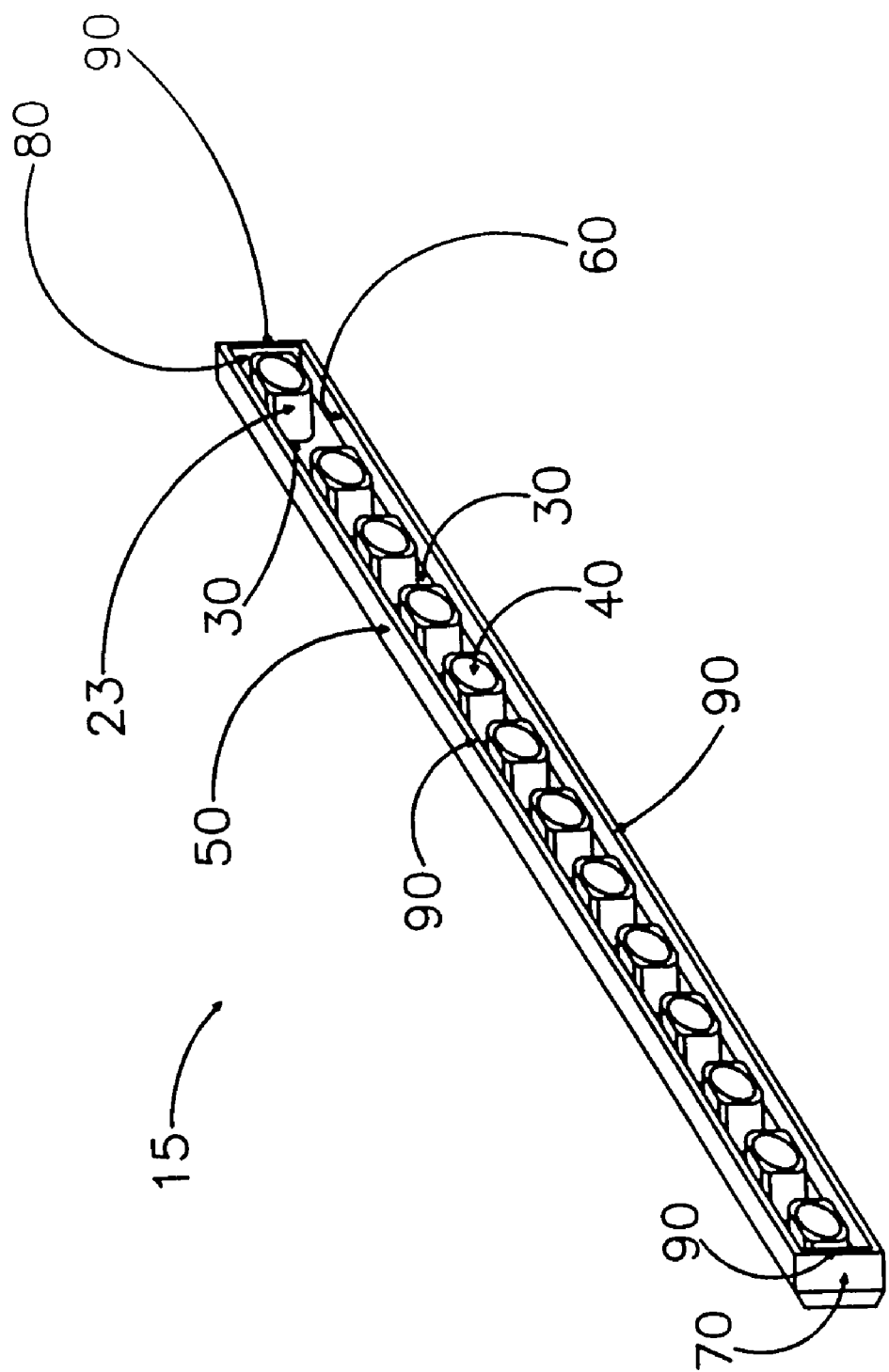
FIG. 1A is a top elevation view of a modified overmolding insert intended to provide a fully open inlet at each and every hollow conduit junction with the manifold when used with a removable hollow conduit supporting mandrel.
Figure 2:
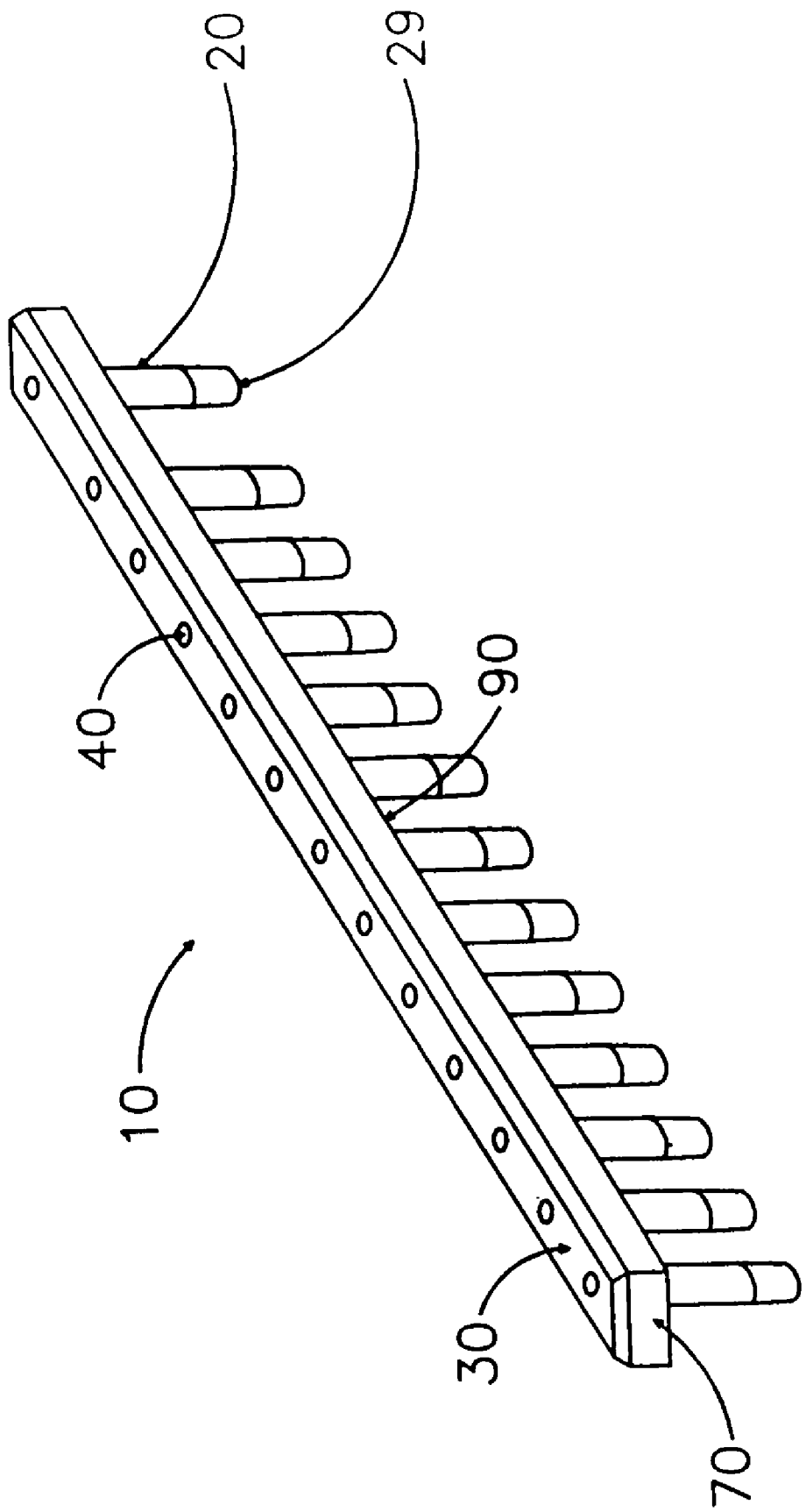
FIG. 2 is a bottom elevation view of the overmolding insert shown in FIG. 1.
Figure 2A:
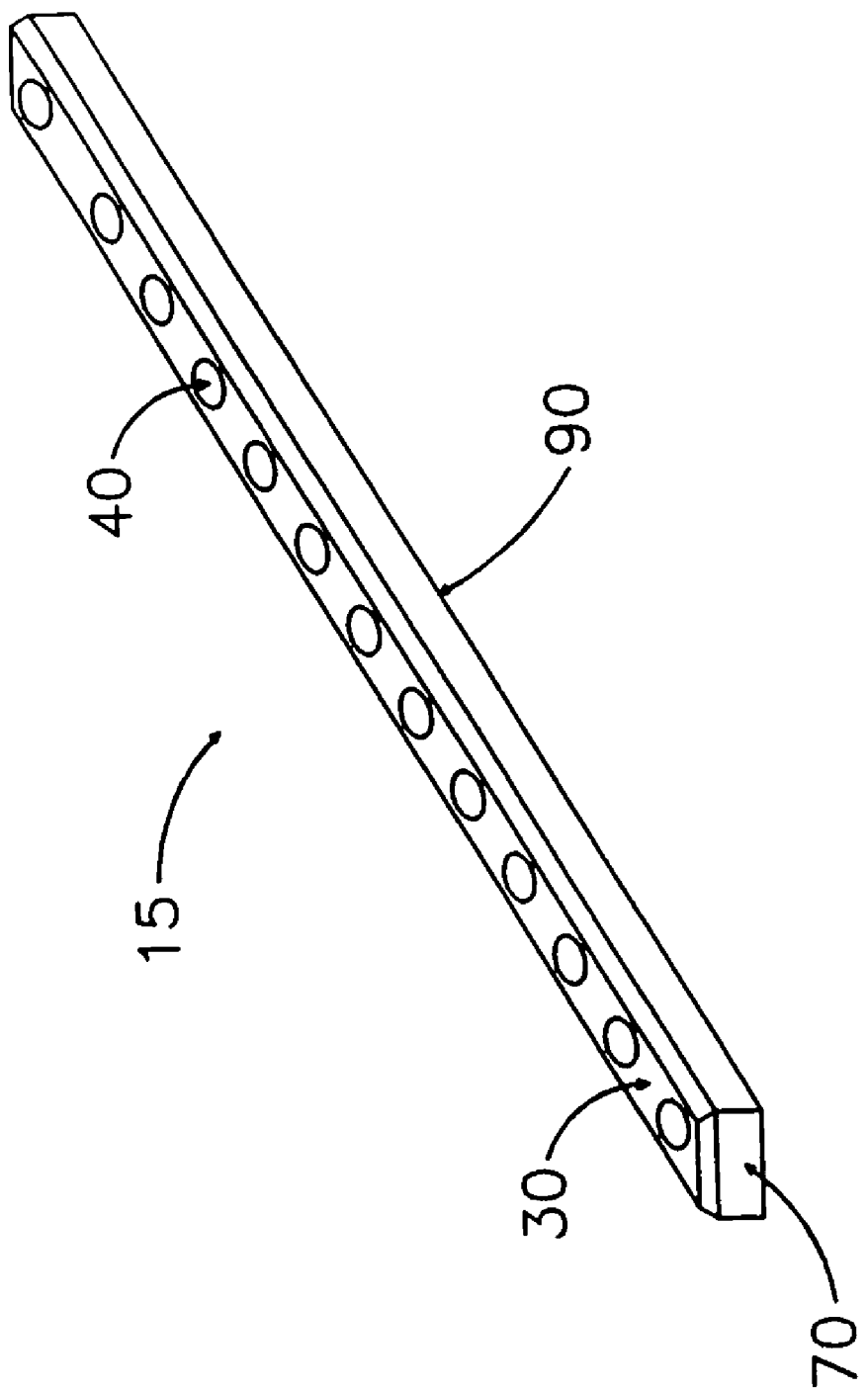
FIG. 2A is a bottom elevation view of the modified overmolding insert shown in FIG. 1A.

The embodiment of the invention which employs the overmolding insert illustrated in FIGS. 1 and 2 features non-removable hollow projections which slightly constrict water flow during operation of the heat exchanger. Water constriction may not be desirable in some applications. Thus, a second embodiment of the invention provides a process for manufacturing a non-constricting heat exchanger using the modified overmolding insert 15 shown in FIGS. 1A and 2A. The modified overmolding insert shown in FIGS. 1A and 2A is constructed in identical fashion to overmolding insert 10 shown in FIGS. 1 and 2, except for the absence of hollow projections. Referring to FIGS. 1A and 2A, modified overmolding insert 15 includes a base having at least one opening in a first surface, the opening being in communication with a second surface opposite the first surface. See FIG. 2A, where base 30 is illustrated with a plurality of coplanar holes 40 spaced along its longitudinal axis.

Modified overmolding insert 15 has a partially closed space defined by the first surface of base 30, side walls 50 and 60, and end walls 70 and 80. Hollow base abutments 23 communicate with a hole 40 of base 30 but, unlike the hollow projections 20 of overmolding insert 10, do not extend beyond the height of side walls 50 and 60.

The hollow base abutments are adapted to be placed against the ends of the hollow conduits of a tube mat prior to an overmolding operation. A non-constricting heat exchanger may then be manufactured by a process which includes a) providing a overmolding insert comprising a base having at least one opening in a first surface, said opening being in communication with a second surface opposite said first surface, said overmolding insert further comprising two opposed side walls, each side wall being joined to said first surface, two opposed end walls being joined to an opposite end of said first surface and extending from one side wall to the other side wall, such that the side walls, the end walls and the first surface define a partially closed space;

b) removably inserting a removable projection into said opening in a first surface of said overmolding insert such that the projection extends from said first surface and beyond said partially closed space, c) fitting an end of a hollow conduit over said removable projection;

d) molding molten polymeric material over said overmolding insert and said hollow conduit end to form a manifold; and e) removing said removable projection from said manifold.

FIG. 8A illustrates a cross-section of the non-constricting manifold prepared by the process described above. As shown therein, an end of hollow tube 120 abuts against abutment 23 of overmolding insert 15. Hollow tube 120 communicates with internal space 145 of manifold 140 through overmolding insert 15 without any constriction of water flow during operation.

In yet another embodiment of the invention an overmolding insert is not employed to join the ends of a tube mat to a manifold. In this embodiment, portions of web 130 located at the end of tube mat 110 are removed prior to overmolding the manifold around the ends of the tube mat 110 to form a notch 135, as shown in FIG. 6. The absence of web material at these locations permits the two melt fronts of the molten polymeric manifold material that contact the upper and lower surfaces of the tube mat 110 to meet and fuse together through notch 135, thereby resulting in a stronger bond. This is because two molten melt streams converging together will create a stronger bond than a single melt stream flowing against one side of an inserted solid tube mat 110 surface that must be melted by heat supplied only by the single melt stream. This melt-to-melt bond reinforces the manifold against a hoop stress induced by internal manifold pressure that is encountered during operation of the heat exchanger. The resulting heat exchanger includes:

a tube mat comprising a plurality of coplanar, hollow tubes connected to one another by a web;

a first manifold connected at one end of each hollow conduit, a second manifold connected at the opposite end of each hollow conduit, wherein at least one of the first and second manifolds has been made by an overmolding process in which the ends of each hollow conduit are overmolded to form said manifold, and wherein a portion of the web located at an end of the web has been removed prior to overmolding said manifold to create a notch in which a mass of manifold material having a thickness at least equal to a thickness of a manifold wall is located after the overmolding process is completed.

As shown in FIG. 6, it is desirable that the width of notch 135 be as wide as the spacing of hollow conduit 120 will comfortably allow, and that the depth of notch 135 be at least equal to the overall thickness of the manifold wall at the notch area to obtain the maximum reinforcing effect.

As illustrated in FIG. 6, it is also possible to provide one or more holes 137 adjacent an end of tube mat 110 which will be overmolded into a manifold. During the overmolding operation, molten manifold material injected into the mold will fill and solidify within holes 137, thus mechanically locking tube mat 110 into the manifold.

A heat exchanger prepared from the overmolding insert of the present invention enjoys decisive advantages over conventional heat exchangers. These advantages include the complete isolation of the manifold/hollow conduit interface from water circulating within the heat exchanger during operation, which reduces the possibility of leakage.

Yet another advantage of a heat exchanger prepared from the overmolding insert of the present invention is that the location of the primary seal between the overmolding insert and an overmolded manifold will reduce strain upon the manifold imposed by any given hoop stress, which helps to protect the integrity of the water-tight seal.

Still another advantage of the overmolding insert of the present invention is that lower molding temperatures can be used to achieve the desired water-tight seal, thereby resulting in less flashing in the molding process, faster molding cycle times, diminished deterioration of the polymer, and less energy consumption.

As discussed above, this invention has been disclosed in detail in the context of preferred embodiments of a solar collector. One of ordinary skill in the art, having read this detailed disclosure, will readily recognize that heat exchangers other than solar collectors are included in the scope and spirit of this invention, and that other embodiments and modifications of the disclosed and preferred embodiments are possible. The attached claims are intended to encompass all such embodiments and modifications.

We claim:

1. A process for manufacturing a heat exchanger manifold, comprising
    a) providing an overmolding insert comprising a base having at least one first opening in a first said surface, said first opening being in communication with a corresponding second opening in a second surface opposite said first surface, said overmolding insert further comprising two opposed side walls, each side wall being joined to said first surface, two opposed end walls being joined to an opposite end of said first surface and extending from one side wall to the other side wall, such that the side walls, the end walls and the first surface define a partially closed space, wherein said second surface is only bonded to said end walls and said side walls;
    b) removably inserting a removable projection into said opening in a first surface of said overmolding insert such that the projection extends from said first surface and beyond said partially closed space,
    c) fitting an end of a hollow conduit which extends beyond said partially closed space and has an opening in communication with said first opening of said first surface over said removable projection;
    d) molding molten polymeric material over said overmolding insert and said hollow conduit end to form a manifold; and
    e) removing said removable projection from said manifold.

2. The process of claim 1, wherein said removable projection is removably inserted into said opening, thereby forming a sub-assembly, prior to placing said sub-assembly into a mold.

3. A process for manufacturing a heat exchanger manifold, comprising
    a) inserting at least one insert into a mold;
    b) fitting at least one end of at least one hollow conduit over at least one hollow projection, and
    c) molding molten polymeric material around said overmolding insert and said hollow conduit to form a manifold,
    wherein said overmolding insert comprises
    a base having at least one first opening in a first surface, each said first opening being in communication with a corresponding second opening in a second surface opposite said first surface,
    at least one hollow projection extending from said first surface of said base, said hollow projection having a first opening in communication with first the opening of said first surface and a second opening located at a terminal portion of said hollow projection,
    said insert further comprising two opposed side walls, each side wall being joined to said first surface, two opposed end walls being joined to an opposite end of said first surface and extending from one side wall to the other side wall, such that the side walls, the end walls, and the first surface define a partially closed space,
    wherein said terminal portion of said hollow projection extends beyond said partially closed space, and wherein said second surface is only bonded to said end walls and said side walls.

4. A process for manufacturing a heat exchanger manifold, comprising
    a) connecting said hollow projection of the overmolding molding insert to an end of a hollow conduit, thereby forming a sub-assembly,
    b) placing said sub-assembly in a mold, and
    c) molding molten polymeric material around said overmolding insert and said hollow conduit,
    wherein said overmolding insert comprises
    a base having at least one first opening in a first surface, each said first opening being in communication with a corresponding second opening in a second surface opposite said first surface,
    at least one hollow projection extending from said first surface of said base, said hollow projection having a first opening in communication with the first opening of said first surface and a second opening located at a terminal portion of said hollow projection,
    said insert further comprising two opposed side walls, each side wall being joined to said first surface, two opposed end walls being joined to an opposite end of said first surface and extending from one side wall to the other side wall, such that the side walls, the end walls, and the first surface define a partially closed space,
    wherein said terminal portion of said hollow projection extends beyond said partially closed space, and wherein said second surface is only bonded to said end walls and said side walls.

* * * * *

UNITED STATES PATENT AND TRADEMARK OFFICE
CERTIFICATE OF CORRECTION

PATENT NO. : 7,112,297 B2  Page 1 of 1
APPLICATION NO. : 10/697302
DATED : September 26, 2006
INVENTOR(S) : Williams et al.

It is certified that error appears in the above-identified patent and that said Letters Patent is hereby corrected as shown below:

On the Title Page

Item
[*] Notice: Subject to any disclaimer, the term of this patent is extended or adjusted under 35 USC 154(b) by (65) days Delete the phrase "by 65" and insert --by 165 days--

Signed and Sealed this

Nineteenth Day of February, 2008

JON W. DUDAS
*Director of the United States Patent and Trademark Office*